Sept. 16, 1930.     D. W. SCURLOCK     1,775,698
EMPTYING DEVICE FOR ICE PANS OF REFRIGERATION APPARATUS
Filed Jan. 11, 1929    2 Sheets-Sheet 2
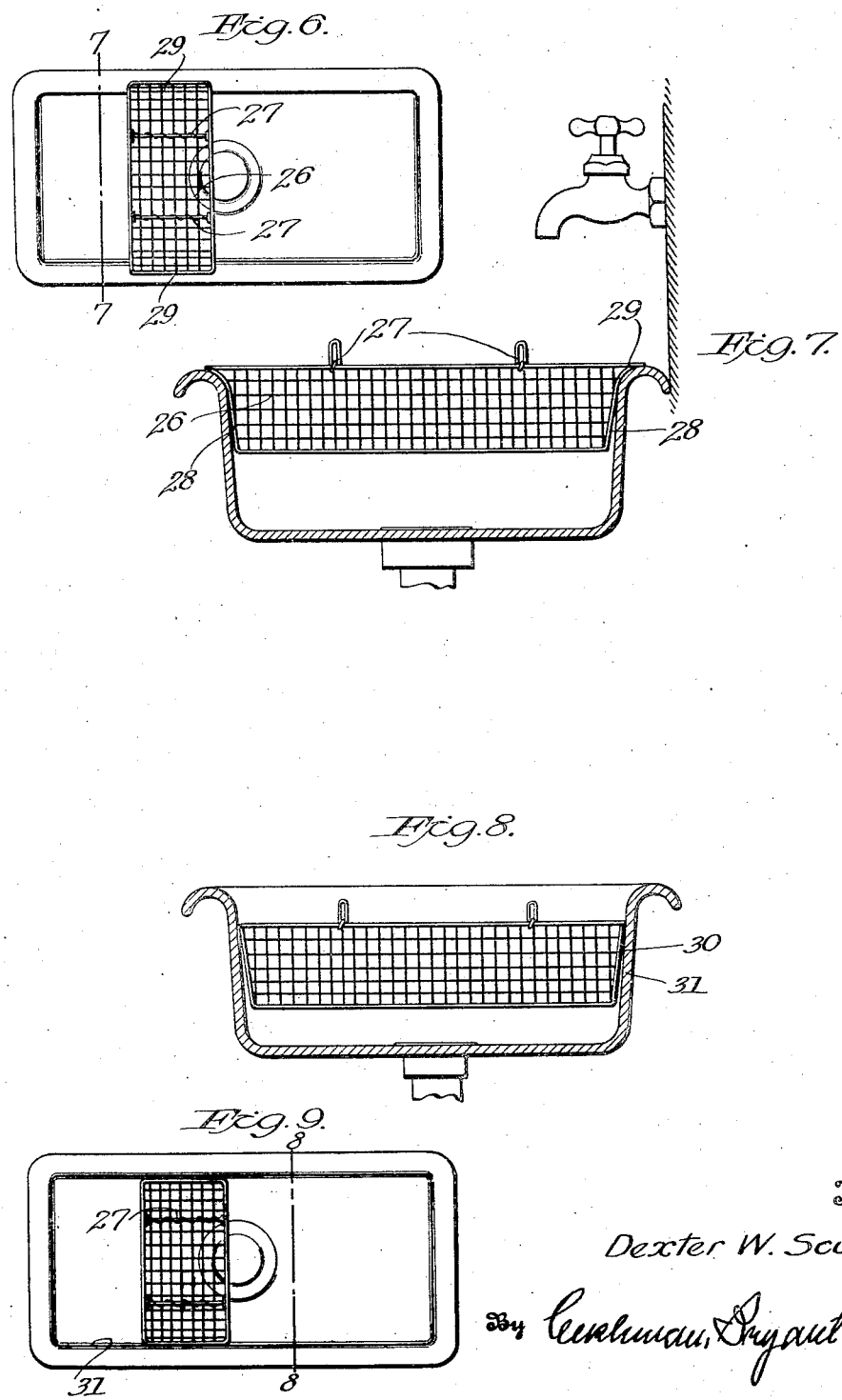

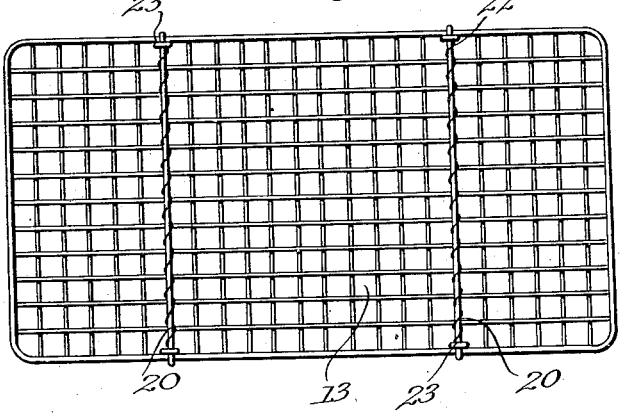
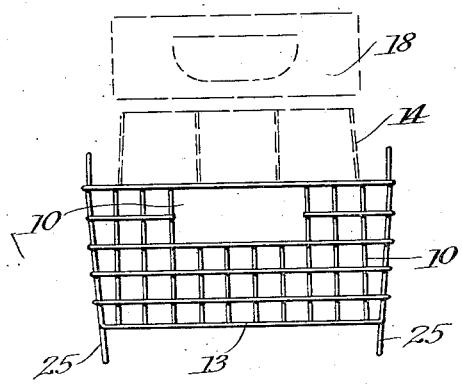
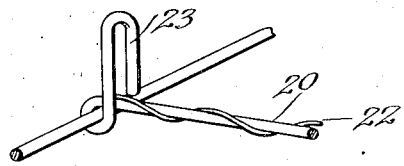
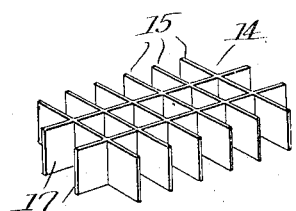
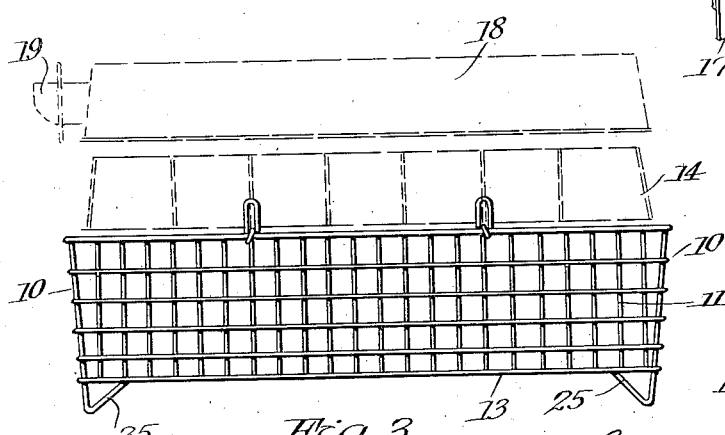

Patented Sept. 16, 1930

1,775,698

UNITED STATES PATENT OFFICE

DEXTER W. SCURLOCK, OF FORT WORTH, TEXAS

EMPTYING DEVICE FOR ICE PANS OF REFRIGERATION APPARATUS

Application filed January 11, 1929. Serial No. 331,926.

The present invention relates to refrigerating apparatus and more particularly to refrigerating apparatus of the type commonly in domestic use and which manufactures ice for home consumption.

Refrigerating apparatus of this type ordinarily include one or more pans, each containing a grid adapted to form a cube of ice when water placed in the pan is frozen by the apparatus. In order to remove the ice from the pan and grid for use, it is customary to invert the pan, and place the same beneath a spigot or other source of water which will melt the ice sufficiently to permit removal of the grid from the pan. The grid is then maintained beneath the water until it melts the cubes sufficiently to cause the same to drop from the grid. This method of removing the ice cubes from the pan and grid is objectionable for the reason that it involves the wetting of the hands, since the pan and grid must be held in the water stream until the cubes drop from the grid. Also the splashing of the water make the removal an unpleasant operation.

An object of the present invention is to provide a device which will facilitate the removal of the ice cubes from the pan and grid, and which will render unnecessary the holding of the grid and pan while the water is applied.

A further object of the invention is to provide a device which will support the ice-filled grid beneath a spigot or other source of water, and permit the cubes to drop from the grid while it is supported.

A still further object of the invention is to provide a device of this character, which may be manufactured and sold at small cost, and which because of its construction, will maintain the cubes out of contact with the sink or other receptacle in which the device is positioned for application of the water to the ice.

The foregoing and other objects of the invention more closely related to the details of construction of certain preferred embodiments illustrated in the accompanying drawings will become clearer as the description proceeds. In the drawings:

Figure 1 is a top plan view.
Figure 2 is an end elevational view showing an ice-filled grid positioned upon the device and with the pan removed.
Figure 3 is a side elevational view of the device illustrated in Figs. 1 and 2.
Figure 4 is a detail view.
Figure 5 is a perspective of the grid.
Figure 6 is a top plan view showing a modified construction positioned in a sink.
Figure 7 is a sectional view on the line 7—7 of Fig. 6.
Figure 8 is a sectional view on the line 8—8 of Fig. 7.
Figure 9 is a top plan view of the modified form shown in Fig. 8.

Referring to the drawings for a more detailed description, the ice grid and pan supporting device preferably includes a receptacle such as a tray or basket having end walls 10, side walls 11 and a bottom 13. These walls may be formed of any suitable material, and one or more of the same should preferably be provided with openings to permit the discharge of water. For this purpose, the basket may be formed of wire, as illustrated, and in order to facilitate lifting of the same, the end walls 10 may be provided with end openings 10', one of which is shown in Fig. 2. The receptacle is provided with means adapted to support an ice filled grid such as the grid 14 (Fig. 5) which has transversely extending partitions 15 intersected by a pair of longitudinally extending partitions 17, these partitions forming compartments in which the cubes of ice are frozen when the grid is inserted in a water filled pan 18, shown in inverted position in Figs. 2 and 3, and ordinarily provided with a handle 19. A suitable means for supporting the pan and ice-filled grid may take the form of transversely extending wire-like elements 20, extending inwardly from the walls of the receptacle and spaced substantially above its bottom, at least a sufficient distance to permit the cubes as they fall from the grid to leave the same entirely.

It is preferable to employ supports 20 of wire-like form so that the same, when aligned with the transversely extending partition 15 of the wall, as illustrated in Fig. 3, will not prevent dropping of the cubes from the adjacent grid compartments after the ice has melted sufficiently. Therefore, the wire-like elements or supports 20 will preferably be of sufficiently small diameter and suitably spaced so that they may be aligned with the partitions 15 of the grid and will not project beneath the ice cubes.

In the construction illustrated, these supports extend entirely across the top of the receptacle and are spaced from its ends, since being thus spaced they wall prevent the pan and grid from tilting. In order to prevent sliding movement and disalignment of the grid partitions 15 and the supports 20 thereBeneath, the surfaces of the latter may be suitably roughened, as by coiling thin threadlike wire 22 thereabout, although other means for roughening the surfaces of the supports may be employed, such as serrations on the surfaces of the wires 20.

As an additional means for retaining the ice-filled grids upon the supports, the ends of the latter may be bent upwardly to provide inverted U-shaped guards 23, which will prevent the grid from sliding from its supports, should the receptacle not be arranged in exactly a horizontal plane.

When using the device, the same may be arranged within a sink or other container, into which water may be poured for melting the ice. The ice-filled pan and grid are then placed upon the supports in inverted position, as illustrated in Figs. 2 and 3, and water is poured or permitted to flow from the spigots upon the bottom of the pan. This will cause the ice adhering to the bottom of the pan to melt slightly, and the pan may then be lifted, as illustrated in Fig. 2. Continuation of the flow of water upon the ice-filled grid will cause the ice cubes to melt sufficiently and then to drop into the receptacle. In view of the alignment of the rods or wire-like supports 20 with the partitions of the grid, they will not interfere with the gravitation of the cubes from the adjacent compartments of the grid into the receptacle.

As will be observed from Figs. 2 and 3, the receptacle has depending legs 25 which will serve to space its bottom from the sink, and thus the ice cubes will not come in contact either with the water which may accumulate in the sink or with any refuse therein.

As will be obvious, the device permits the removal of the ice without attention, since the cubes will automatically fall into the receptacle or tray. It will be understood that it is not necessary to pour water or other melting fluid upon the ice, since if the device is maintained in a warm room, the ice will melt in a short time without attention, so that the cubes will drop automatically into the receptacle. However, the application of water will hasten the removal, and obviously, it is not necessary to hold the receptacle while the water is applied and while the cubes are dropping into the tray.

Referring to Figs. 6 and 7, the construction shown therein is similar to that of Figs. 1, 2 and 3. It comprises a foraminous receptacle 26 having the transversely extending wire-like supports 27 for the pan and grid exactly similar to the supports 20 of the device illustrated in Fig. 1. In this form, however, the end walls 28 are flared outwardly at 29, so as to fit over the edge of the sink and serve as means, in lieu of legs 25 (Fig. 3) for supporting the receptacle with its bottom spaced from the bottom of the sink. In order that the device may be employed with sinks of different widths, it may be made of light wire so as to be readily distortable within a limited range or may be lengthwise telescopic. It is thought unnecessary to illustrate a tray of telescopic character, since trays of this character are broadly old in the receptacle art.

Referring to Figs. 8 and 9, the construction there shown is similar to that of Figs. 1, 2 and 3, except that instead of the supporting legs 25, the end walls 30 are inclined sufficiently to cause the device to wedge into the sink against the walls 31 of the same. Thus the device will be supported in this wedging manner with its bottom spaced above the bottom of the sink. This form of device may also be telescopic or variable in length; or it may be made of light wire, so as to be readily distortable within a limited range for use in sinks of different sizes. It includes the transversely extending supports 27' identical in construction with the supports described in the form of Figs. 1, 2 and 3.

Obviously, the invention is not limited to the precise details illustrated and described, and numerous modifications of the same may be made without departing from the inventive idea, the scope of which is more definitely set forth in the following claims.

I claim:—

1. A device for supporting an ice-filled inverted ice pan and grid of a domestic refrigeration apparatus comprising a tray having foraminous walls and having spaced substantially above its bottom supports adapted to serve as rests for a grid while permitting gravitation of the ice cubes from the grid into the tray.

2. A device for supporting an ice-filled inverted ice pan and grid of a domestic refrigeration apparatus comprising a tray having foraminous walls and having spaced substantially above its bottom and extending inwardly from its walls supports adapted to serve as rests for a grid while permitting gravitation of the ice cubes from the grid into the tray.

3. A device for supporting an ice-filled inverted ice pan and grid of a domestic refrigeration apparatus comprising a tray having foraminous walls and having spaced substantially above its bottom transversely extending supports to serve as rests for a grid, said supports being of substantially the thickness of the grid walls and being spaced to align with the grid walls whereby to support the grid.

4. A device for supporting an ice-filled inverted ice pan and grid of a domestic refrigeration apparatus comprising a tray adapted to be inserted in a sink, and means on said tray for supporting the ice-filled grid within the sink above the bottom of the tray while permitting the ice cubes to gravitate from the grid into the tray, said tray being provided with one or more apertures to permit water poured upon the ice to flow from the tray.

5. A device for supporting an ice-filled inverted ice pan and grid of a domestic refrigeration apparatus comprising a tray adapted to be inserted in a sink, means for supporting the tray with its bottom spaced above the sink bottom, and means on said tray for supporting the ice-filled grid within the sink above the bottom of the tray while permitting the ice cubes to gravitate from the grid into the tray, said tray being provided with one or more apertures to permit water poured upon the ice to flow from the tray.

In testimony whereof I have hereunto set my hand.

DEXTER W. SCURLOCK.